US008596190B2

(12) United States Patent
Roysner et al.

(10) Patent No.: US 8,596,190 B2
(45) Date of Patent: Dec. 3, 2013

(54) LIQUID FOOD FOUNTAIN

(75) Inventors: Scott M. Roysner, Woodland Hills, CA (US); Howard F. Wilkinson, Woodland Hills, CA (US); Bernard Strong, Garzara, CA (US); Peter E. Karaiskos, Northridge, CA (US)

(73) Assignee: World-Wide Foods, a CA Corp., Woodland Hills, CA (US)

( * ) Notice: Subject to any disclaimer, the term of this patent is extended or adjusted under 35 U.S.C. 154(b) by 1221 days.

(21) Appl. No.: 11/631,229

(22) PCT Filed: Apr. 27, 2005
(Under 37 CFR 1.47)

(86) PCT No.: PCT/US2005/014523
§ 371 (c)(1),
(2), (4) Date: Aug. 24, 2009

(87) PCT Pub. No.: WO2006/049644
PCT Pub. Date: May 11, 2006

(65) Prior Publication Data
US 2010/0024665 A1 Feb. 4, 2010

Related U.S. Application Data

(60) Provisional application No. 60/623,194, filed on Oct. 29, 2004.

(51) Int. Cl.
*A01J 11/00* (2006.01)
*A23G 1/04* (2006.01)
*A23G 1/18* (2006.01)
*A23G 3/22* (2006.01)

(52) U.S. Cl.
CPC *A23G 1/042* (2013.01); *A23G 1/18* (2013.01); *A23G 3/22* (2013.01)
USPC .................................. 99/452; 239/16; 239/28

(58) Field of Classification Search
USPC ............ D1/199; D7/300, 304, 305, 306, 355, D7/356, 505, 507; D15/7; D23/201; 237/56; 239/16–29, 29.3, 29.5, 30–32, 239/722; 222/192, 411–413; 99/310, 413, 99/483, 452; 426/306, 584, 103; 219/429; 285/73
See application file for complete search history.

(56) References Cited

U.S. PATENT DOCUMENTS

| 157,635 A | 12/1874 | Churns |
| D46,797 S | 12/1914 | Blackmarr |

(Continued)

FOREIGN PATENT DOCUMENTS

| FR | 929856 | 1/1948 |
| GB | 2 273 884 A | 7/1994 |

OTHER PUBLICATIONS

PCT International Search Report for International Application No. PCT/US05/14523, dated Oct. 3, 2005.

*Primary Examiner* — Henry Yuen
*Assistant Examiner* — Thien S Tran
(74) *Attorney, Agent, or Firm* — Christie, Parker & Hale, LLP

(57) ABSTRACT

A liquid food fountain comprises a center barrel having a top opening and a bottom opening and a plurality of stackable modules (16, 14, 12, 10) adapted for a slip fit on the center barrel (20). Each module has a tier (16) extending around the center barrel (10). A liquid collector (24) is adapted to be placed below the modules. An auger (34) assembly is adapted to fit inside the center barrel to carry liquid entering the center barrel at the bottom opening to the top opening. A drive module is connectable to the auger assembly. The described parts can be assembled for use and disassembled for cleaning and storage.

38 Claims, 7 Drawing Sheets

(56) References Cited

U.S. PATENT DOCUMENTS

| | | | | |
|---|---|---|---|---|
| 1,322,803 A | * | 11/1919 | MacFadden | 237/56 |
| D113,465 S | | 11/1938 | Ohrenschall | |
| 2,655,354 A | * | 10/1953 | Murray | 366/274 |
| 3,329,409 A | * | 7/1967 | Raleigh | 366/146 |
| 3,967,722 A | | 7/1976 | Dietert | |
| 4,173,405 A | | 11/1979 | Swapceinski et al. | |
| 4,202,759 A | * | 5/1980 | Krolopp et al. | 209/234 |
| 4,379,965 A | * | 4/1983 | Dounce et al. | 219/521 |
| 4,493,442 A | | 1/1985 | Hanson, Jr. | |
| 4,682,475 A | | 7/1987 | Nelson | |
| 4,732,301 A | | 3/1988 | Tobais et al. | |
| 4,960,601 A | | 10/1990 | Cummins | |
| 4,964,520 A | * | 10/1990 | Kilmartin, III | 211/131.1 |
| 4,974,751 A | * | 12/1990 | King | 222/142 |
| 5,022,939 A | * | 6/1991 | Yajima et al. | 148/302 |
| 5,154,662 A | | 10/1992 | Moritz, Sr. et al. | |
| 5,191,772 A | | 3/1993 | Engel | |
| 5,326,032 A | | 7/1994 | Quillin | |
| D389,225 S | * | 1/1998 | Coleman | D23/201 |
| 5,743,176 A | | 4/1998 | Anderson et al. | |
| 5,840,345 A | | 11/1998 | Ayash | |
| 5,967,226 A | | 10/1999 | Choi | |
| 5,974,823 A | | 11/1999 | Banno et al. | |
| 6,299,026 B1 | | 10/2001 | Jaleel et al. | |
| 6,425,321 B1 | | 7/2002 | Yip | |
| 6,830,239 B1 | * | 12/2004 | Weber et al. | 261/121.1 |
| 7,021,556 B2 | | 4/2006 | Muir et al. | |
| 2004/0056480 A1 | * | 3/2004 | Walker | 285/61 |
| 2005/0092852 A1 | * | 5/2005 | Muir et al. | 239/16 |
| 2005/0092853 A1 | * | 5/2005 | Muir et al. | 239/16 |

* cited by examiner

LIQUID FOOD FOUNTAIN

CROSS-REFERENCE TO RELATED APPLICATIONS

This application is a National Phase Patent Application of International Application Number PCT/US2005/014523, filed on Apr. 27, 2005, which claims the benefit of the filing date of U.S. Provisional Application No. 60/623,194, filed Oct. 29, 2004.

BACKGROUND OF THE INVENTION

This invention relates to food appliances, and more particularly, to a liquid food fountain.

Liquid food fountains for displaying and/or serving chocolate, cheese, and various types of confectionary are festive attractions at social events. A number of tiers are stacked one on top of the other around a hollow center barrel. A rotating auger assembly disposed inside the barrel extrudes the liquid food from a collection basin at the bottom of the fountain to its top, from which the liquid spills over the tiers and returns to the basin. This process is continued as long as the auger assembly continues to rotate.

Owing to the size and the tacky nature of the material being handled by the fountain, it is difficult and time consuming to clean after use.

SUMMARY OF THE INVENTION

According to one feature of the invention, a liquid food fountain is constructed as a number of separable modules. One of the modules comprises a hollow center barrel. Another of the modules comprises a collection basin, to which the barrel is removably attached. The remaining modules each comprise in a one piece construction a tier and a free standing sleeve sized to slip over the center barrel. An auger assembly is disposed inside the center barrel and extends from the collection basin to the top of the highest tier. The auger assembly is driven by a motor located under the collection basin.

According to another feature of the invention, a liquid food fountain is constructed to display and serve a number of liquid food types at the same time. A collection basin and a number of tiers each have dividers to keep the food types from mixing. Separate auger assemblies and separating sheaths for each food type are disposed inside a single center barrel.

According to another feature of the invention, the auger assembly is supported and driven by a frictionless magnetic coupling.

According to another feature of the invention, the collection basin is made of two pieces. The bottom is made from a good heat conductor such as aluminum and the rim is made from a good insulator such as a plastic material.

According to another feature of the invention, there is a well at the bottom of the collection basin. The bottom of the center barrel is seated in an annular groove formed in the bottom of the well.

According to another feature of the invention, a drive module houses the auger assembly motor and supports a spring-mounted heating element under the collection basin. The heating element has a plurality of springs that urge it into intimate physical contact with the collection basin to insure good heat transfer.

According to another feature of the invention, the tier assembly is provided as a readily disposable unit to facilitate cleaning.

BRIEF DESCRIPTION OF THE DRAWINGS

The features of specific embodiments of the best mode contemplated of carrying out the invention are illustrated in the drawings, in which.

DETAILED DESCRIPTION OF THE INVENTION

Figure 1A:
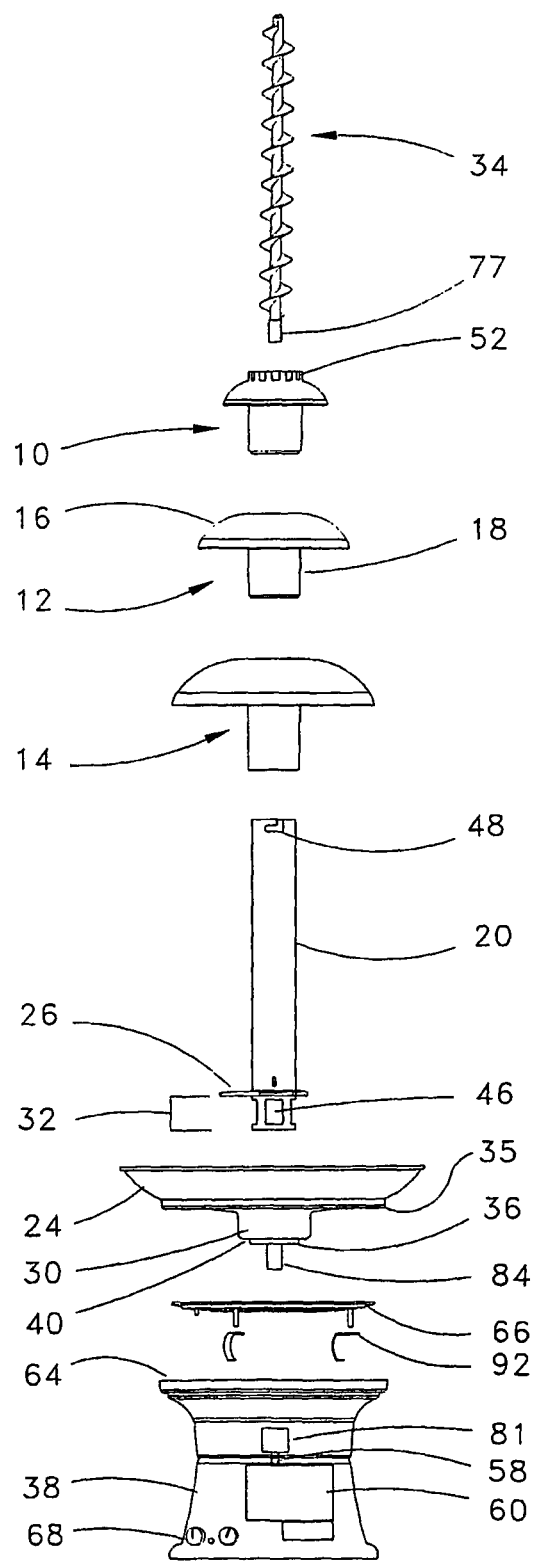
FIG. 1A is an exploded side view of a preferred embodiment (single auger assembly) of a liquid food fountain incorporating principles of the invention when used with a magnetic coupling.

In each embodiment of the invention shown in FIG. 1A to FIG. 4, modules 10, 12 & 14 each comprise a dome-shaped tier 16 and an open sleeve 18 that are formed in one piece. Bosses 47 (FIG. 1B) are formed on the bottom of modules 10 and 12 and matching annular recesses 49 (FIG. 2) are formed at the tops of modules 14 and 16 to insure the modules remain aligned with each other. A center barrel 20 is sized to fit inside sleeve 18 of each module to establish a slip fit. Center barrel 20 is removably attached to a collection basin 24 by a plurality (preferably three in number) of radially extending hooks 26 (FIG. 3) that engage rivets or pegs 28 (preferably three in number) extending up through collection basin 24. Rivets 28 (FIG. 2) each have a head spaced from the upper surface of collection basin 24. When center barrel 20 is twisted, the heads of rivets 28 engage or disengage from hooks 26. Liquid in collection basin 24 flows toward a centrally located well 30. A portion 32 of center barrel 20 lies under hooks 26. An auger assembly 34 is disposed inside center barrel 20. A motor 60 is housed in a drive module 38. A coupling 83 is mounted on the drive shaft of motor 60. The bottom portion 32 fits in an annular groove 40 formed at the center of well 30 to form an annular space 42 (FIG. 3) between portion 32 and the inner surface of well 30. Groove 40 keeps center barrel 20 in proper alignment.

Figure 1B:
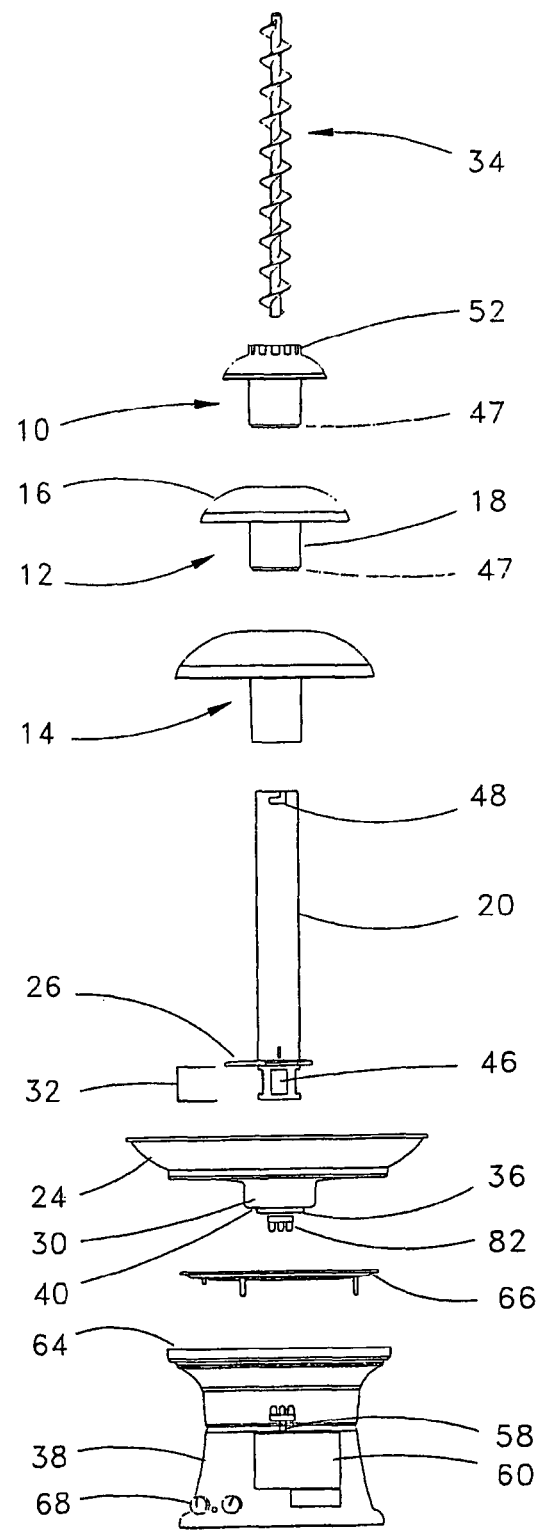
FIG. 1B is an exploded side view of another embodiment (single auger assembly) of a liquid food fountain incorporating principles of the invention when used with a mechanical coupling and a shaft seal.
Figure 2:
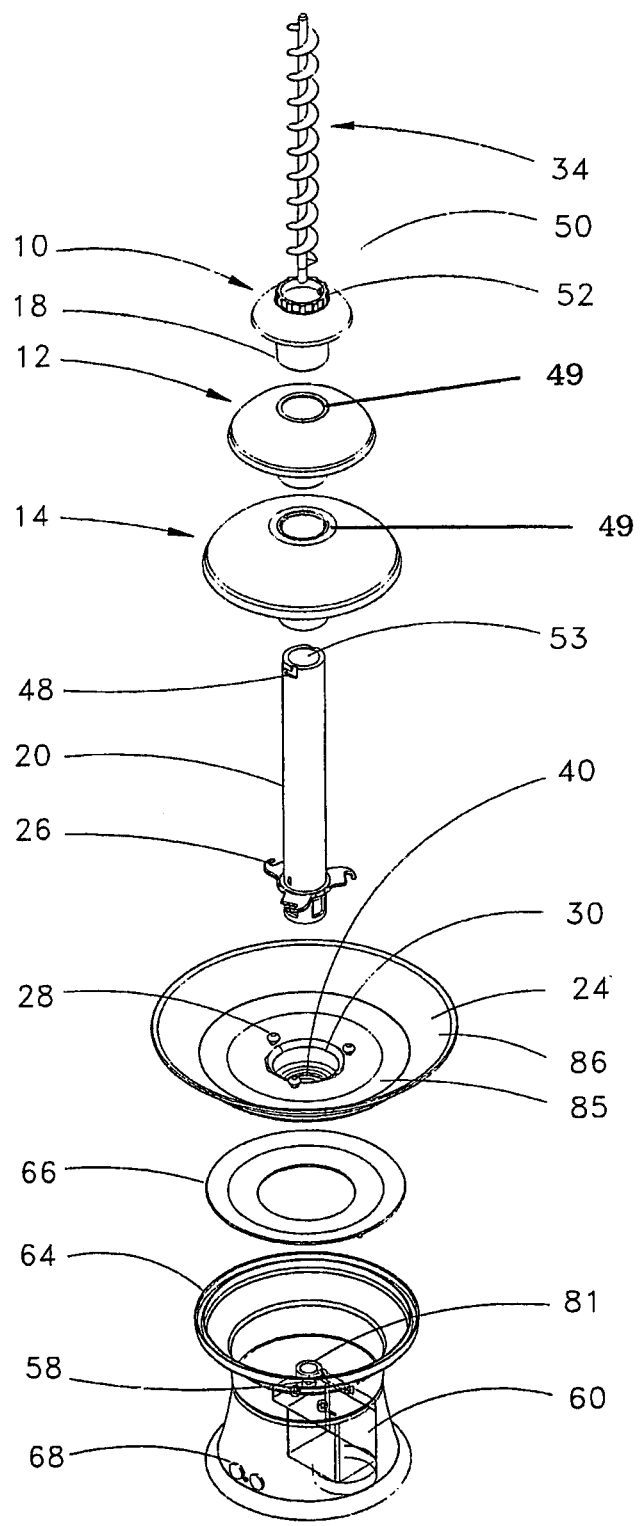
FIG. 2 is an exploded isometric view of the embodiment of FIG. 1A and FIG. 1B.
Figure 3:
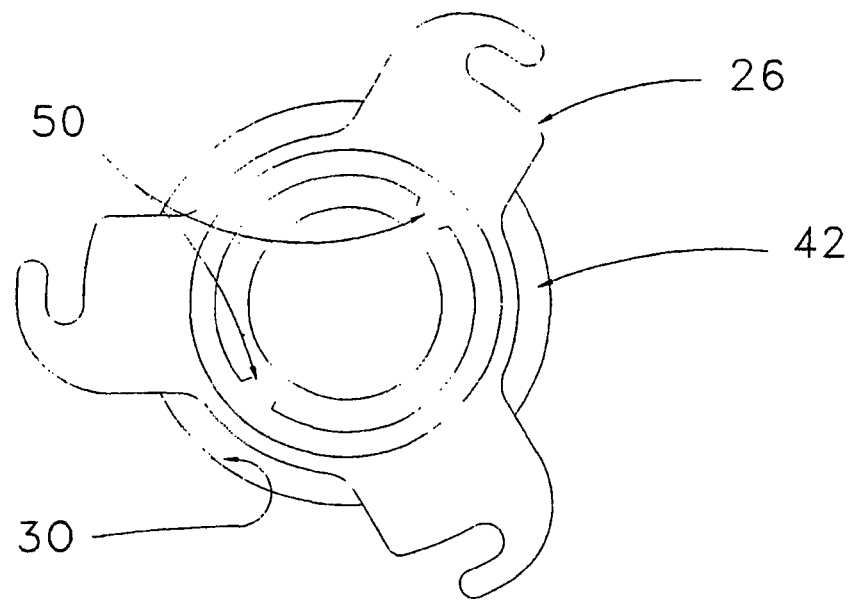
FIG. 3 is a top plan view of the center barrel of FIG. 1A and FIG. 1B illustrating the hooks at the top outside of the center barrel and the nipples in the inside of the top module.
Figure 4:
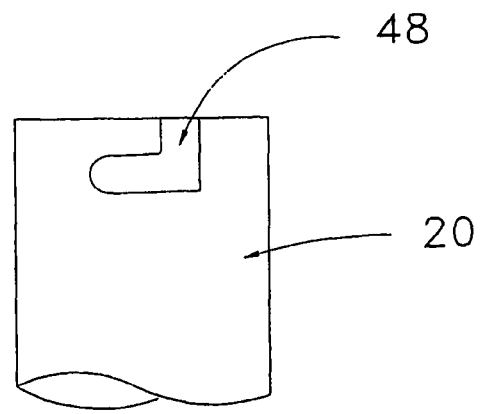
FIG. 4 is a side elevation view of part of the outside surface of the center barrel illustrating the L-shaped slots.

In the embodiment of FIG. 1B, a sealed bearing 36 at the bottom of collection basin 24 connects motor 60 to auger assembly 34.

Figure 8:
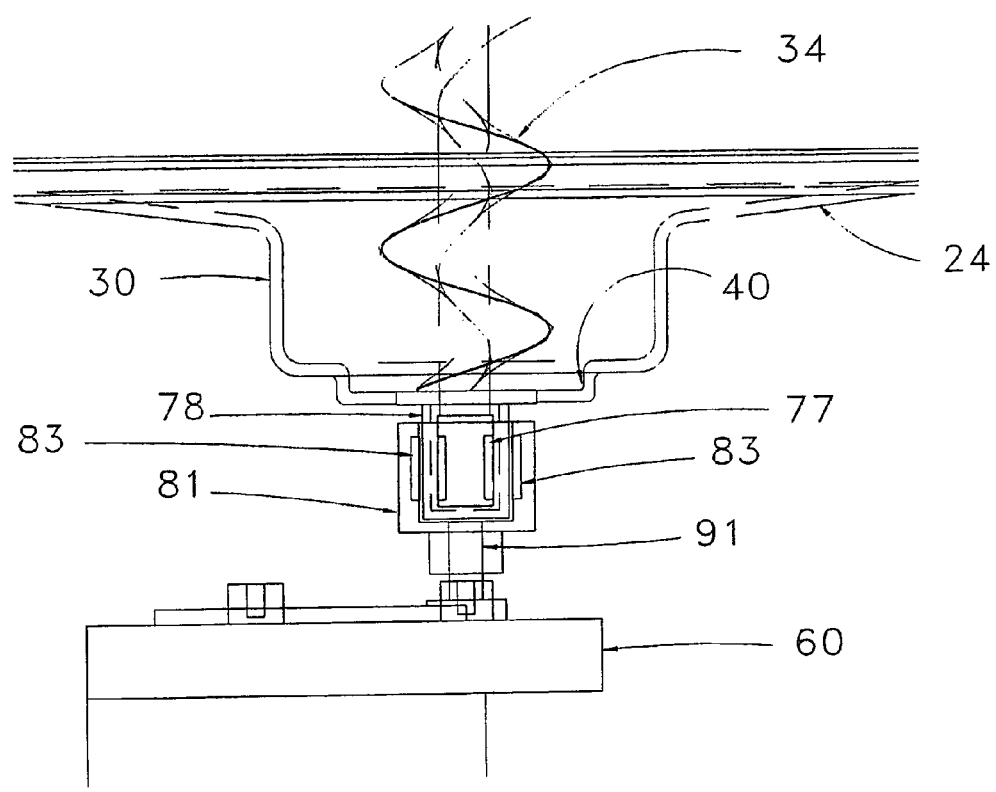
FIG. 8 is a side, partially sectional view of the collection basin and the magnetic coupling.

In the embodiment of FIG. 1A, a magnetic coupling shown in detail in FIG. 8 connects motor 60 to auger assembly 34 obviating the need for a seal.

In both embodiments, a plurality of windows 46 in the side of bottom portion 32 couple annular space 42 to auger assembly 34. Preferably, the height of windows 46 is almost the height of well 30 and close to the height of the pitch of auger assembly 34. The function of well 30 is twofold. As the liquid food in collection basin 24 is moved up center barrel 20 by auger assembly 34, more liquid food flows into well 30. The presence of the well 30 ensures that there is always sufficient liquid food to fill the flights of the auger assembly 34. The presence of the ample liquid food avoids starving the auger thus allowing it to operate at its maximum efficiency. Well 30 also creates a head-height pressure feed of the liquid food to auger 34. This pressure insures that the liquid food is pressure-fed into and not simply pushed away from auger assembly 34. Well 30 permits the operation of the fountain to be accomplished with less liquid food than without well 30. An annular rim 35 on collection basin 24 forms a snap fit with a groove 64 around the top of drive module 38. A heating element 66 is disposed between collection basin 24 and drive module 38. Control knobs 68 on drive module 38 adjust the speed of motor 60 and the temperature of heating element 66.

When modules 10, 12, and 14 are assembled they fit around center barrel 20 in stacked abutting relationship. Module 14 rests on hooks 26, module 12 rests on module 14, and module 10 rests on module 12. A plurality of L-shaped slots 48 (FIG. 4) are formed on the top outside surface of center barrel 20. Nipples 50 (the same in number as slots 48) on the inside of top module 10 (FIG. 3) engage slots 48 and lock the tiers in place when top module 10 is twisted. Top module 10 has a gripping surface 52, which facilitates hand gripping during the locking and unlocking procedure.

Here is the assembly procedure:
1. Place the drive module 38 on a solid, level surface. Align the non-magnetic cup-shaped sheath 84 over the opening in the heating element 66 and gently press down until the collection basin 24 is seated firmly and level on the heating element 66.
2. Align the barrel 20 with the center of collection basin 24 seating annular rim 35 in annular groove 40. Turn the barrel in a clockwise direction until the hooks 26 engage the rivets 28.
3. Slide the auger assembly 34 magnet-side first into the barrel and let it drop. The auger assembly is self-aligning.
4. Stack the tier modules 14, 12 and 10 onto barrel 20 and lock top tier module 10 in place by twisting nipples 50 into "L" shaped slots 48.

Assembly is complete.

After assembly of the fountain, collection basin 24 is filled with liquid food and motor 60 is actuated. As a result, liquid food is extruded from collection basin 24 by auger assembly 34 to opening 53. The liquid food spills out of opening 53 and flows down tiers 16 to collection basin 24.

Figure 5:
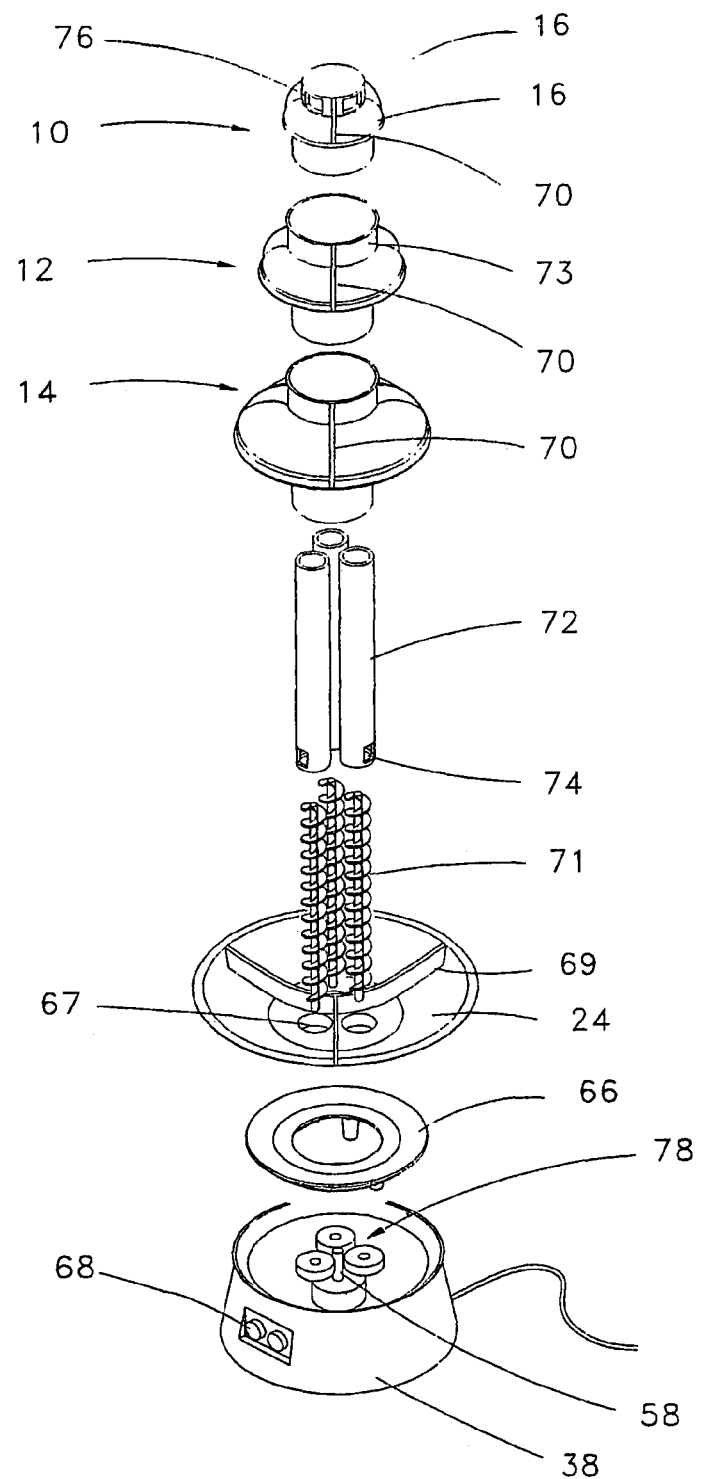
FIG. 5 is an exploded side view of another embodiment (three auger assembly) of a liquid food fountain incorporating principles of the invention.
Figure 6:
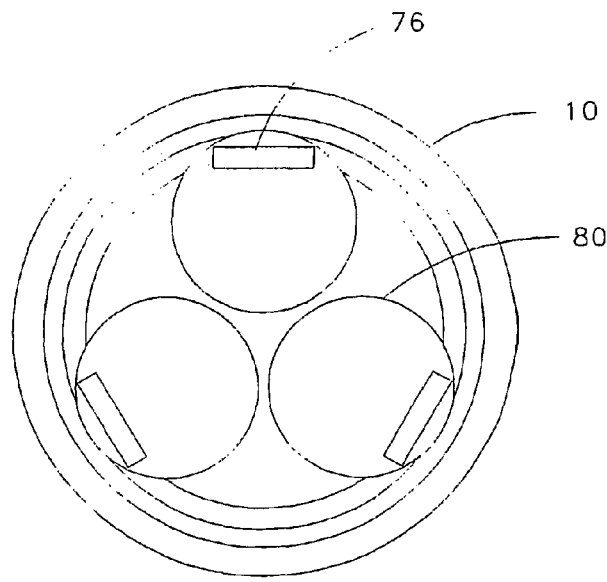
FIG. 6 is a bottom plan view of the top module in the embodiment of FIG. 5, showing the sockets for receiving the three center barrels.

In another embodiment of the invention shown in FIGS. 5 and 6, a liquid food fountain is constructed to display and serve two or more liquid food types at the same time. The same reference numerals are used to identify parts in common with the embodiment of FIGS. 1-4. Assume there are n food types. Collection basin 24 has dividers 69 (n in number) and wells 67 (n in number). Tiers 16 also each have dividers 70 (n in number) and collars 73 (n in number) that confine the liquid to sectioned regions. Dividers 69 and 70 are aligned with each other to keep the food types from mixing as they cascade down tiers 16. Auger assemblies 71 (n in number) are disposed in corresponding center barrels 72 (n in number). One or more windows 74 in the side of the bottom of center barrels 72 couple the respective sectioned regions of collection basin 24 to auger assemblies 71 without permitting the different liquid foods to mix.

As illustrated in FIG. 6, inside module 10 there are a plurality of sockets 80 (n in number) for receiving respective center barrels 72. Apertures 76 (n in number) in top tier 16 provide egress for the liquids to the respective sectioned regions of top module 10. Apertures 76 face toward the respective sockets 80. The interface between each center barrel and the respective socket 80 could be a sealed bearing or a magnetic coupling as in the embodiments of FIGS. 1, 2, and 3. In summary, the flow of each type of liquid is confined to sectioned regions throughout its flow path so the different types of liquid do not mix. Drive shaft 58 on motor 60 is coupled to auger assemblies 71 by a set of gears 78. In this embodiment top of tier 16 is closed off to prevent the liquids from spilling out from the top of the fountain.

Figure 7:
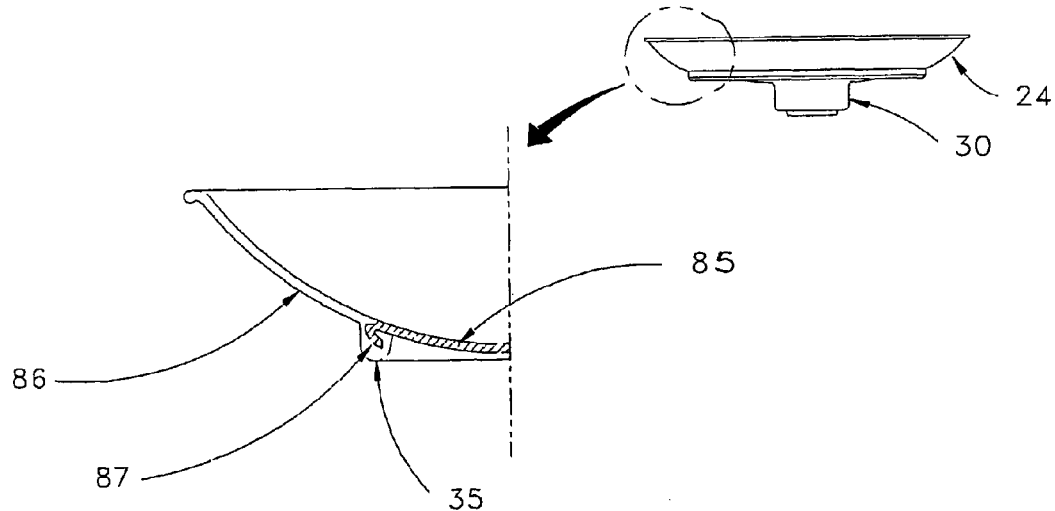
FIG. 7 is a side, partially sectional view of the collection basin illustrating its two material construction.

In one embodiment shown in FIG. 7, collection basin 24 is constructed from two materials permanently attached together. An inner portion 85 is made of aluminum or other good conductor of heat. An outer portion 86 is made of plastic or other good insulator. The plastic is fused with the aluminum by enveloping a hook 87 formed in the aluminum to anchor the plastic. The purpose of this two-material construction is that inner portion 85 is in contact with heating element 66 and there is a very efficient transfer of heat between these surfaces. Because the consumable fluids will be in contact with the inner portion, the transfer of heat to the consumable fluids will be very efficient. Outer portion 86 will serve as an insulator from the heat. This serves as a safety feature as the portions that are most likely to come into contact with the consumer will not be too hot to the touch. Additionally, the use of plastic on outer portion 86 will allow the visible portions of the removable collection basin to have the same appearance as the rest of the product which may be constructed of plastic. The outer lip of inner portion 85 is formed in such a way that during the manufacturing process, the plastic material of outer portion 86 will form around and trap the metal lip of inner portion 85 forming a strong, leak proof bond. In order to maximize the efficiency of the heating system, springs 92 (FIG. 1A) press upon and so urge heating element 66 into close surface contact with inner portion 85 thus providing for the maximum thermal transfer with minimum heat loss. The configuration of these springs may be accomplished in any number of ways including coil-type and leaf-type springs. In addition to cutting operating costs, maintaining full contact with inner portion 85 means heat is distributed evenly and this results in an even heating of the liquid food within the removable collection basin 24, thus preventing hot-spots and burning of the consumable fluid. Heating element 66 is connected to a 110 volt outlet by means not shown.

FIG. 8 shows one embodiment of a drive mechanism for auger assembly 34. According to this aspect of the invention, a magnetic coupling eliminates the need for a mechanical seal at the interface between the drive mechanism and the auger assembly. The bottom of auger assembly 34 has embedded into it a plurality of horizontally oriented anisotropic magnets 77. A non-magnetic cup 84 is provided at the bottom of well 30 within which auger assembly 34 can rotate. Accordingly, the bottom of collection basin 24 is completely closed by cup 84, thus eliminating any possibility of leakage. A magnet holder 81 surrounds cup 84 and is fixedly attached to motor shaft 91. A further plurality of horizontally oriented anisotropic magnets 83 are positioned radially around and within magnet holder 81. Due to the strong magnetic attraction between magnets 77 and 83, as magnet holder 81 is rotated by motor shaft 91, magnets 77 rotate in concert with magnets 83, thus rotating auger assembly 34. Because of the magnetic attraction between magnets 77 and 83, the bottom of auger assembly 34 is suspended within cup 84 and there is no contact between the surfaces of the interface. The result is a frictionless, efficient, quiet coupling that requires no mechanical seal.

Preferably, cup 84, in additional to being non-magnetic, is also electrically conductive. As a result, eddy currents circulate in the space between magnets 77, which generates heat to keep the temperature of the liquid food high enough to flow easily in the small spaces between parts.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, if a disposable fountain is desired, modules 10, 12, and 14 could be molded as a single unit. Or the fountain could be designed to handle non-food liquids in a decorative multi-colored display.

What is claimed is:

1. A liquid food fountain comprising:
   a center barrel having a top opening and a bottom opening;
   a plurality of stackable modules adapted for a slip fit on the center barrel, each module having a tier extending around the center barrel;
   a liquid collector adapted to be placed below the modules;
   an auger assembly adapted to fit inside the center barrel to carry liquid entering the center barrel at the bottom opening to the top opening;
   a drive module connectable to the auger assembly;
   a rotatable drive shaft housed in the drive module;
   a first set of one or more magnets attached to the drive shaft;
   a second set of one or more magnets attached to an end of the auger, the first set of magnets surrounding the second set of magnets so the auger is adapted to rotate with the drive shaft; and
   a stationary non-magnetic electrically conducting cup coupled to the liquid collector, the cup disposed between the first and second sets of magnets and surrounding the auger in closely spaced relationship so eddy currents generated in the cup heat the space between the cup and the magnets, and wherein the end of the auger is suspended in the cup.

2. The fountain of claim 1, in which the tiers are dome-shaped.

3. The fountain of claim 2, in which each module also has a sleeve adapted to fit around the center barrel.

4. The fountain of claim 3, in which the sleeve and the tier of each module are formed in a one piece construction.

5. The fountain of claim 4, in which the tiers have cavities and the sleeves lie in the cavities of the tiers.

6. The fountain of claim 5, additionally comprising a heating element adapted to fit between the collector and the drive module.

7. The fountain of claim 6, in which the auger assembly has a shaft connectable at one end to the drive module and the inside of the center barrel has a spider adapted to support the other end of the auger assembly shaft.

8. The fountain of claim 7, in which an inside of the collector has a plurality of rivets and the center barrel has a plurality of hooks adapted to engage the rivets and thereby attach the center barrel to the collector.

9. The fountain of claim 8, in which a well is formed in the collector and center barrel has windows adapted to lie in the well when the center barrel is attached to the collector.

10. The fountain of claim 9, in which a height of the windows is at least as large as a pitch of the auger assembly.

11. The fountain of claim 10, wherein the tiers include an uppermost tier located proximate the top opening of the center barrel, the uppermost tier adapted for spilling liquid away from the top opening without accumulation of the liquid at the top opening.

12. The fountain of claim 11, further comprising a heater assembly in the drive module, the heater assembly including a heating element for heating the liquid collector and springs for urging the heating element against underside of the liquid collector for facilitating thermal transfer from the heating element to the liquid collector.

13. The fountain of claim 12, in which an interface is formed between the tier and the sleeve of adjacent modules, one of the sleeve and the tier having a recess around its edge and the other of the sleeve and the tier having a boss around its edge to establish a seat at the interface.

14. The fountain of claim 13, in which the tiers or the liquid collector are manufactured of disposable materials that would facilitate cleaning process.

15. A liquid food fountain comprising:
   a plurality of center barrels each having a top opening and a bottom opening;
   a plurality of stackable modules adapted for mounting on the center barrels, each module having a tier extending around the center barrels;
   a plurality of dividers on the tiers equal in number to the center barrels, the dividers being alignable with each other to keep separate liquid that exits the openings at the top of the center barrels;
   a liquid collector adapted to be placed below the modules;
   a plurality of auger assemblies equal in number to the center barrels, the auger assemblies being adapted to fit inside the respective center barrels to carry liquid entering the respective center barrels at the bottom opening to the top opening; and
   a drive module connectable to the auger assembly.

16. The liquid food fountain of claim 15, wherein the center barrels are molded together into a single unit.

17. The liquid food fountain of claim 15, wherein the modules are adapted for a slip fit on the center barrels, each module having a sleeve extending around the corresponding center barrel.

18. A liquid food fountain comprising:
   a plurality of center barrels each having a top opening and a bottom opening;
   a plurality of stackable modules adapted for mounting on the center barrels, each module having a tier extending around the center barrels;
   a plurality of dividers on the tiers equal in number to the center barrels, the dividers being alignable with each other to keep separate liquid that exits the openings at the top of the center barrels;
   a liquid collector adapted to be placed below the modules, wherein the liquid collector includes a well located proximate center of the liquid collector, the well divided into sections, each section adapted for accumulating a respective portion of the liquid in the liquid collector;
   a plurality of auger assemblies equal in number to the center barrels, the auger assemblies being adapted to fit inside the respective center barrels to carry liquid entering the respective center barrels at the bottom opening to the top opening, and wherein each auger is adapted for carrying at least a portion of the liquid accumulated within the well; and
   a drive module connectable to the auger assembly 19. The liquid food fountain of claim 18 wherein the drive module is adapted for generating currents that spread across the well, and wherein the well is adapted for holding liquid such that the currents heat the liquid accumulated in the well.

20. The liquid food fountain of claim 15 wherein the liquid food collector includes a first section and a second section, and wherein the first section comprises aluminum and the second section comprises plastic.

21. The liquid food fountain of claim 15 further including a base for supporting the liquid collector.

22. The liquid food fountain of claim 21 further comprising a heater assembly in the base, the heater assembly including a heating element for heating the liquid collector and springs for substantially urging the heating element against underside of the liquid collector for facilitating thermal transfer from the heating element to the liquid collector.

23. The liquid food fountain of claim 15 wherein the drive module comprises a magnetic drive assembly for rotating the augers.

24. A liquid food fountain comprising:
a center barrel having a top opening and a bottom opening;
a plurality of stackable modules mounted on the center barrel, each module having a tier extending around the center barrel;
a liquid collector adapted to be placed below the modules, the liquid food collector including a first portion comprising a conductor material and a second portion comprising an insulator material;
a heating element contacting the first portion of the liquid collector;
an auger adapted to fit inside the center barrel to carry liquid entering the center barrel at the bottom opening to the top opening; and
a drive module connectable to the auger assembly;
wherein the liquid collector includes a well located proximate center of the liquid collector, the well adapted for accumulating a portion of the liquid in the liquid collector, and wherein the auger is adapted for carrying at least a portion of the liquid accumulated within the well.

25. The liquid food fountain of claim 24 wherein the drive module is adapted for generating currents that spread across the well, and wherein the well is adapted for holding liquid such that the currents eat the liquid accumulated in the well.

26. The liquid food fountain of claim 24 wherein the center barrel includes a plurality of windows proximate the bottom opening, and wherein the windows are adapted for admitting at least a portion of the liquid accumulated within the well.

27. The liquid food fountain of claim 24 further including a base for supporting the liquid collector.

28. The liquid food fountain of claim 27 further comprising a heater assembly in the base, the heater assembly including the heating element for heating the liquid collector and springs for urging the heating element against underside of the liquid collector for facilitating thermal transfer from the heating element to the liquid collector.

29. The liquid food fountain of claim 24 wherein the drive module comprises a magnetic drive module, and wherein the magnetic drive module is coupled to the auger for rotating the auger such that the auger extends vertically upward from the liquid food collector during normal operation of the liquid food fountain.

30. The liquid food fountain of claim 24 wherein the tiers include an uppermost tier located proximate the top opening of the center barrel, the uppermost tier adapted for spilling liquid away from the top opening without accumulation of the liquid at the top opening.

31. The liquid food fountain of claim 24 wherein two or more of the modules are molded together as a single piece unit.

32. The liquid food fountain of claim 24 wherein the modules and tiers are disposable.

33. The liquid food fountain of claim 24 wherein the liquid collector is disposable.

34. The liquid food fountain of claim 24 comprising a plurality of augers and wherein the liquid collector is divided into a plurality of sections, each section in fluid communication with one of augers for enabling the fountain to display a plurality of flavors of liquid without substantially mixing the flavors.

35. The liquid food fountain of claim 34, further comprising one or more center barrels adapted for housing a respective one of the augers.

36. The fountain of claim 6, wherein the drive module includes a motor shaft with a drive magnet mounted on one end of the motor shaft, and wherein the auger assembly includes an anisotropic magnet at an auger assembly bottom end, the anisotropic magnet being magnetically coupled to the drive magnet for driving the auger assembly.

37. The fountain of claim 36, wherein the drive magnet is mounted in a magnet holder surrounding the auger assembly bottom end.

38. The fountain of claim 37, wherein the drive magnet includes a plurality of anisotropic magnets positioned radially around the magnet holder.

* * * * *

UNITED STATES PATENT AND TRADEMARK OFFICE
CERTIFICATE OF CORRECTION

PATENT NO. : 8,596,190 B2  Page 1 of 1
APPLICATION NO. : 11/631229
DATED : December 3, 2013
INVENTOR(S) : Roysner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1891 days.

Signed and Sealed this
Twenty-second Day of September, 2015

Michelle K. Lee
*Director of the United States Patent and Trademark Office*